Patented Nov. 5, 1929

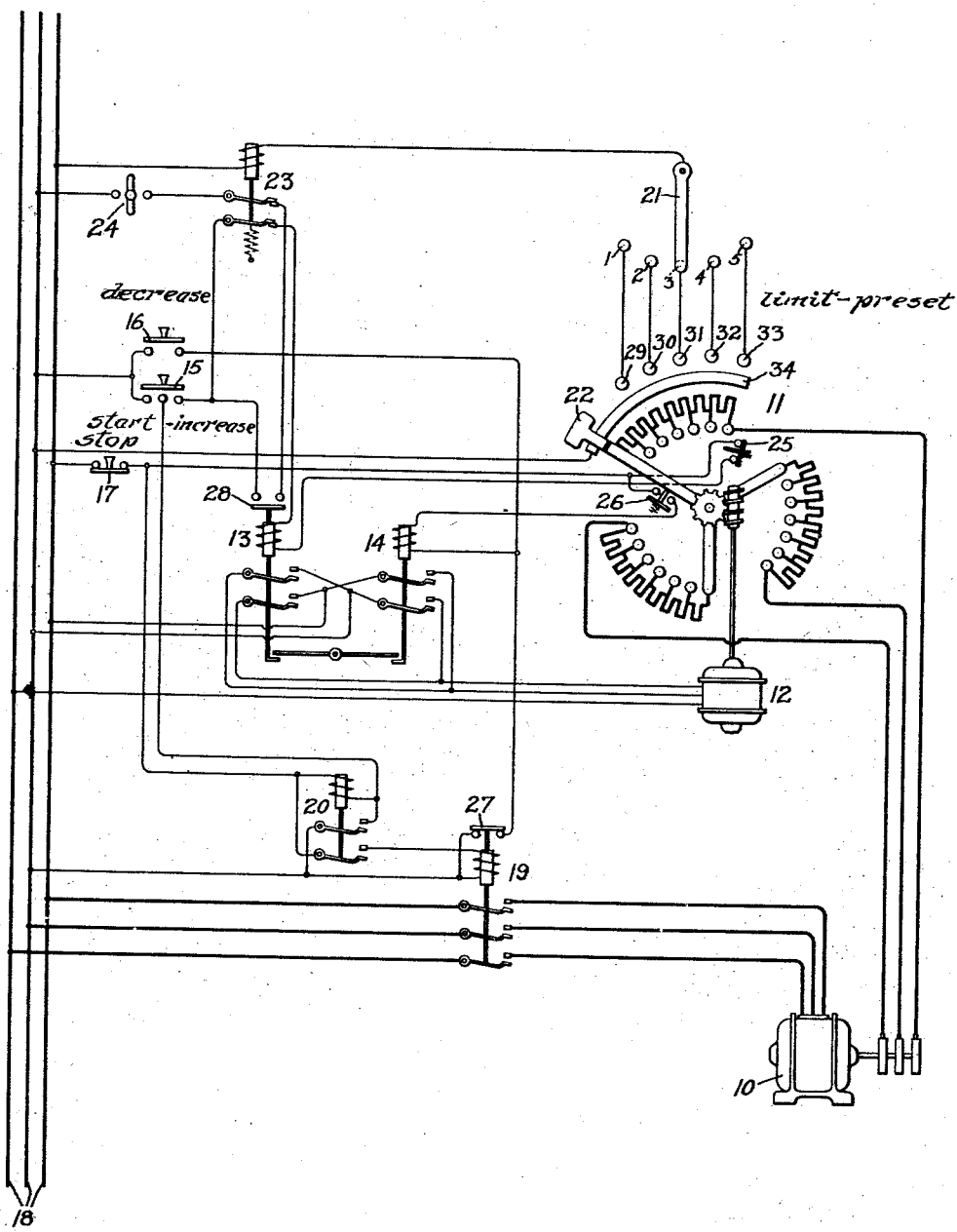

1,734,919

UNITED STATES PATENT OFFICE

CARL F. SCOTT, OF SCHENECTADY, NEW YORK, ASSIGNOR TO GENERAL ELECTRIC COMPANY, A CORPORATION OF NEW YORK

MOTOR CONTROLLER

Continuation of application Serial No. 141,185, filed October 12, 1926. This application filed March 7, 1928. Serial No. 259,818.

My invention relates to improvements in controllers for electric motors and in particular to improvements whereby speed variation of the motor or motors may be had within predetermined limits at the will of the operator under certain conditions and under other conditions the final speed which the operator is able to effect is a speed intermediate the said limits.

The invention has a particular application in drives for printing presses and the like where it is desirable for the pressman to have full control of the speed of the press at certain times, so as to run at any one of a large number of speeds, and where at other times it is desirable that the pressman be unable to accelerate the press to a speed in excess of a limit set and adjusted by the press room foreman.

This application is a continuation of my application for a patent on a motor controller, filed October 12, 1926, bearing the Serial No. 141,185.

The invention will be understood by a consideration of the accompanying drawing when taken in connection with the following description. The said drawing shows in simplified diagram a system of control for an alternating current motor in accordance with the invention.

Referring to the drawing, the electric motor 10 to be controlled is indicated as of the three phase wound rotor type. Speed variation of this motor is effected by means including the automatically operated rheostat 11 included in the rotor circuit of the motor. The speed regulating rheostat is operated by means of the pilot motor 12 which is under the control of the directional reversing contactors 13 and 14 and the master switch mechanism comprising the start increase push button 15, the decrease push button 16 and the stop push button 17. The main driving motor 10 is connected to the three phase source of supply 18 by means of the line contactor 19. This line contactor is controlled by means of the relay 20 which is provided for the purpose of maintaining the line contactor 19 closed after the initial operation of the start increase push button 15, as will be explained hereinafter. The equipment heretofore referred to provides means whereby the operator may obtain at will any speed variation he desires within the limits imposed by the regulating rheostat 11.

Under certain conditions, as above set forth, it is desirable for the foreman of the press room to be able to limit the final speed effected by the operator, and I have provided a simple and effective arrangement whereby this speed limitation is accomplished. The means whereby this result is accomplished includes the manually operable and usually remote-located multi-position limit-preset switch 21 which cooperates with the movable contact 22 of the speed varying controller 11, the relay 23, and the pilot switch 24.

The operation of my invention as thus constructed and arranged is as follows: In order to start the motor 10 and accelerate the same, the start increase push button 15 is first depressed. This will cause the relay 20 to be energized and closed and the closing of this relay will energize the line contactor 19 to close and connect the motor to the source of supply 18. When the relay 20 closes it establishes a maintaining circuit for the winding of line contactor 19 through a circuit including the stop push button 17 and excluding the push button 15 so that it is merely necessary to temporarily depress the push button 15 to connect the motor 10 to the source of supply for the slow speed operation. The directional contactor 13 for the pilot motor 12 will also be energized in response to the depression of the push button 15. The circuit for this contactor is from the middle supply conductor of source 18, contacts of push button 15, lower contact of relay 23, coil of directional contactor 13, through the speed varying controller limit switch 25, and the stop push button 17 to another conductor of the source 18. Assuming prior operation of the pilot switch 24 to the closed position, the directional contactor 13 in closing will close its upper auxiliary contacts 28 to short-circuit the push button 15 through the pilot switch 24 and upper contact of relay 23 thereby establishing a holding circuit for directional contactor 13. Therefore, by depressing the push button 15, the pilot motor 12 will be energized from the source 18 to cause the main contact arm of controller 11 to rotate clockwise, short-circuiting step by step the resistance included in the rotor circuit of the motor 10. This will effect automatic acceleration of the motor 10 until the resistance has all been short-circuited and the limit switch 25 is opened. In case it is desired to stop the motor 12 before the final limit of operation of the controller 11 has been reached, the pilot switch 24 is operated to break the holding circuit through the winding of directional contactor 13. The directional contactor 13 is thus opened causing the motor 12 to stop, so that the speed of the motor 10 will remain as determined by the final position of the controller arm of the controller 11. It will also be seen that with the pilot switch 24 opened by depressing the push button 15 and holding the button depressed the pilot motor 12 may be energized to rotate the contact 22 in a clockwise direction. In case the push button 15 is released before the final limit of operation of the controller 11 has been reached, the directional contactor 13 will be opened and the motor 12 stopped, so that the speed of the motor 10 will remain as determined by the final position of the controller arm of the controller 11. If the operator desires to decrease the motor speed, he will depress the push button 16 and thus energize the directional contactor 14 through a circuit including the push button 16, coil of contactor 14, limit switch 26 and stop push button 17. Speed variation is thus had at the will of the operator.

If at any time the controller arm of the controller 11 is in an intermediate position or in its final speed position and it is desired to stop the motor 10, the stop push button 17 will be depressed, thereby deenergizing the controlling relay 20 and in turn deenergizing the line contactor 19. The motor 10 will thus be disconnected from its source of supply and the line contactor 19 in opening will close its associated auxiliary switch 27. When the push button 17 is released the controller 11 will be automatically returned to its initial position (that indicated in the drawing) by reason of the energization of the pilot motor line contactor 14. The energizing circuit for this contactor includes the auxiliary switch 27 of contactor 19, winding of contactor 14, limit switch 26 and stop push button 17. It is thus seen that when the driving motor 10 is deenergized and stopped, the speed varying controller will always be automatically returned to its initial position.

Let it be assumed that the motor 10 is connected to drive a printing press and that the operator has "made up" the press through his full automatic control of the starting and speed variation of the motor 10 effected by means of the arrangement referred to above and that he is ready to run the press at the speed set by the press foreman. The press foreman will adjust the limit-preset switch 21 to any one of its definite positions, for instance the third position as shown in the drawing, and close the pilot switch 24. Then when the push button 15 is depressed, the line contactor 19 for the main motor 10 and the directional contactor 13 for the motor 12 will be energized as before. The directional contactor 13 in closing will close its auxiliary contacts 28 and a maintaining circuit for the directional contactor 13 will thus be established from the middle supply conductor through pilot switch 24, upper contact of relay 23, switch 28, lower contact of relay 23, coil of contactor 13, limit switch 25 and stop push button 17. Thus the pilot motor 12 will be maintained energized to operate the controller arm over the contacts 29 and 30 until the contact 22 engages the contact 31. When the contact 22 engages the contact 31, the coil of relay 23 is energized through a circuit from the middle supply conductor, segment 34 of controller 11, contact 22, contact 31 and the limit-preset switch member 21. The contacts of relay 23 are then opened and the holding circuit through directional contactor 13 will be broken, causing the pilot motor 12 to be deenergized. The motor 10 will continue to operate, however, and at a speed determined by the position of switch 21. It is impossible for the operator to speed the motor up above this predetermined speed since the coil of directional contactor 13 cannot now be energized by depressing the push button 15 as the contacts of relay 23 are held open by the coil of the relay 23. As a matter of safety, however, the operator may by depressing the button 16 cause the motor 12 to be energized to return the contact 22 to its initial position, shown in the drawing. Although only a temporary operation of the push button 15 is thus required to effect automatic acceleration of the motor 10 to the speed limit set by the press foreman, the operator of the equipment is unable to exceed the speed set by the foreman, since the pilot switch 24, the relay 23 and the limit-preset switch member 21 will all preferably be located in an enclosure to which only the press foreman has the key. Although the operator is unable to exceed the final speed as set by the press foreman, nevertheless he is able to effect a speed reduction by depressing the push button 16. The press foreman may vary at will the final speed of the press by varying the position of the switch member 21 so that the contact 22 will stop on either one of the contacts 29 to 33, inclusive. By depressing the push button 17, the motor 10 will be deenergized and stopped in the same manner as previously explained and it will also be noted that upon the release of the stop push button 17 the pilot motor 12 will be automatically energized to return the controller 11 to its initial position preparatory for the next starting and acceleration of the motor 10.

It will be seen from the above that my invention provides a very simple and effective means whereby under certain conditions full control of the driving motor 10 and the machine operated thereby may be had by the operator and whereby a final speed limit may be imposed and this final speed limit cannot be exceeded unless the superintendent or foreman desires.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States is:

1. In combination in a system of motor control, an automatic motor controller for varying the speed of the motor between predetermined limits, means cooperating with said controller for limiting the final speed of the motor to a speed intermediate said limits, master switch mechanism, for controlling said controller to increase and decrease the speed of said motor and connections through which said master switch mechanism is operative to control at will the motor speed variation effected by said controller between said limits provided said means is not rendered effective and is operative to merely effect speed variation to a speed intermediate said limits when said means is rendered effective.

2. The combination with an electric motor and governing means therefor for controlling the connection of the motor to a source of supply and for increasing and decreasing at will the speed of the motor between predetermined limits, the said means including manually operable master switch mechanism and power operated mechanism under the control thereof, of manually controlled adjustable limit switch mechanism which when rendered effective cooperates with said power operated mechanism and said master switch mechanism to automatically effect speed variation of said motor and restrict the same to a speed intermediate said predetermined limits in response to a temporary operation of said master switch mechanism.

3. In combination in a system of motor control, a speed varying controller, a pilot motor for operating the same, reversing switch mechanism for controlling said pilot motor, a fast push button and a slow push button, adjustable limit switch mechanism for predetermining the final speed of the motor effected by said controller, and connections through which said pilot motor is energized to effect speed variation by said controller while said fast push button is held depressed provided said limit switch mechanism is not rendered effective, and in response to a temporary depression of said fast push button, said pilot motor is energized to automatically operate said controller only to the limit determined by said limit switch mechanism when said limit switch mechanism is rendered effective.

4. In a system of motor control means for varying the speed of a main driving motor between predetermined limits including an "increase" button, a "decrease" button and a motor operated speed controlling rheostat controlled thereby, a limit-preset switch cooperating with said "increase" button and connections by means of which the speed to which the said motor may be increased by said "increase" button is limited to a value intermediate said limits.

5. In a system of motor control for varying the speed of a main driving motor including master switch mechanism for increasing the speed of said motor between predetermined limits, a limit preset switch and a relay cooperating therewith for rendering said master switch mechanism ineffective to increase the speed of said motor beyond a value intermediate of said limits, as determined by said limit preset switch.

6. In a system of motor control a speed varying controller, and a pilot motor for operating the same, an "increase" button and reversing switch mechanism controlled thereby for controlling said pilot motor, means for limiting the final speed of the motor that may be effected by said controller including a limit preset switch and a relay cooperating therewith, a locking circuit for said reversing switch mechanism including the normally closed contacts of said relay whereby temporary depression of said "increase" button is effective to operate said controller to the limit predetermined by said limit-preset switch, and a manually operable switch included in said locking circuit operable to the "off" position to open said locking circuit for rendering continued depression of said "increase" button necessary to increase the speed of the motor to the limiting value determined by said limit-preset switch.

In witness whereof, I have hereunto set my hand this 6th day of March, 1928.

CARL F. SCOTT.